(12) United States Patent
Linsbauer

(10) Patent No.: US 6,314,649 B1
(45) Date of Patent: Nov. 13, 2001

(54) WORK APPARATUS

(75) Inventor: Peter Linsbauer, Remshalden (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/523,162

(22) Filed: Mar. 10, 2000

(30) Foreign Application Priority Data

Mar. 11, 1999 (DE) .............................................. 199 10 793

(51) Int. Cl.$^7$ ............................ A01D 34/68; A01D 34/82
(52) U.S. Cl. ............................ 30/276; 30/275.4; 56/12.7; 384/295; 384/296
(58) Field of Search ................................... 30/275.4, 276, 30/277.4; 56/12.7; 384/295, 296; 464/52

(56) References Cited

U.S. PATENT DOCUMENTS

| | | | |
|---|---|---|---|
| 4,172,322 | * 10/1979 | Ballas | 30/276 |
| 4,226,021 | * 10/1980 | Hoff | 56/12.7 |
| 4,463,498 | * 8/1984 | Everts | 30/296.1 |
| 4,505,040 | * 3/1985 | Everts | 30/296.1 |
| 5,170,561 | * 12/1992 | Sepke | 30/276 |
| 5,414,934 | 5/1995 | Schlessmann | 30/275.4 |

* cited by examiner

Primary Examiner—Hwei-Siu Payer
(74) Attorney, Agent, or Firm—Walter Ottesen

(57) ABSTRACT

The invention relates to the assembly of a shaft bearing (16) in the end section (6) of a guide tube (5) of a brushcutter (1). The guide tube (5) accommodates a drive shaft. The bearing (16) is axially inserted into the end section (6) and is held so that it cannot separate therefrom. The outer diameter ($D_M$) of the outer surface (18) of the bearing (16) is configured smaller than the inner diameter ($D_I$) of the end section (6) in order to facilitate assembly and to ensure a force-tight inseparable seating of the bearing 16 in the end section. Several axial ribs (19, 20, 21) are distributed uniformly over the periphery of the outer surface (18). The radial elevation (H) of the axial ribs is slightly greater than approximately half the difference between the inner diameter ($D_I$) of the end section (6) and the outer diameter ($D_M$) of the surface (18) of the bearing (16). To mount the bearing (16), the end section is elastically deformed so far until the diameter ($D_V$) is slightly greater than the axial maximum outer diameter (24) of the bearing (16). The diameter ($D_V$) is measured from a corner (27) and the maximum outer diameter (24) is determined by the radial height (H) of the axial ribs (19, 20, 21). The end section (6) returns elastically in the direction toward its initial form after the axial insertion of the bearing (16). The bearing (16) is then surrounded force tight by the end section (6).

20 Claims, 5 Drawing Sheets

WORK APPARATUS

FIELD OF THE INVENTION

The invention relates to a work apparatus having a drive motor and the work apparatus is especially a vegetation cutter. The invention also relates to a method for the axial assembly of a shaft bearing.

BACKGROUND OF THE INVENTION

U.S. Pat. No. 5,414,934 discloses a vegetation cutter apparatus which includes a bearing axially inserted into the end section of the guide tube of the apparatus. The bearing holds the cutterhead on the guide tube and is axially secured by providing a stop projecting radially into the end section.

The bearing must be configured so that it is adapted with respect to its outer diameter to the inner diameter of the end section in order to ensure a play-free seating of the bearing in the end section. However, this leads to problems during assembly. If the bearing is configured to have an oversize, then considerable force must be applied when axially inserting the bearing into the end section. At the same time, material is abraded during insertion so that chips are formed. If the bearing has an undersize, then the bearing lies in the end section with play which can lead to impact movements and shaking movements during operation.

SUMMARY OF THE INVENTION

It is an object of the invention to improve a work apparatus of the kind referred to above so that a play-free seating of the bearing which lies in the end section is ensured while, at the same time, ensuring an easy assembly.

The work apparatus of the invention includes: a drive motor; a guide tube having an end connected to the drive motor and having an end section facing away from the drive motor; a rotatably driven work tool mounted on the end section; a drive shaft rotatably journalled in the guide tube and connecting the drive motor to the work tool so as to permit the drive motor to rotatably drive the work tool; the end section defining a longitudinal axis and having an interior space; the end section further having an inner diameter ($D_I$) before being formed; a bearing axially inserted into the interior space for mounting the work tool on the end section; the bearing having an outer surface and a plurality of axial ribs formed on the outer surface; the axial ribs having respective rib roofs conjointly defining an imaginary cylinder having an outer diameter greater than the inner diameter ($D_I$) of the end section; the bearing having an outer shape when viewed in cross section characterized by the outer surface with the axial ribs; and, the end section of the guide tube being elastically formed to assume a shape corresponding to the outer shape of the bearing for surroundingly force tightly holding the bearing.

The method of the invention is for axially assembling a bearing in an end section of a guide tube which approximately concentrically surrounds a drive shaft. The end section has a longitudinal center axis and has an inner diameter ($D_I$) before being formed. The bearing has an outer surface and a plurality of axial ribs formed on the outer surface. The axial ribs have respective rib roofs conjointly defining an imaginary cylinder having an outer diameter greater than the inner diameter ($D_I$) of the end section. The method includes the steps of: essentially elastically deforming the end section by clamping the end section between clamping jaws so that a cornered cross-sectional shape is imparted to the end section with the clamping jaws being applied until the cornered cross-sectional shape has a diameter ($D_V$) measured from a corner which is slightly greater than a distance measured between a rib roof of one of the axial ribs and a diametrically opposite lying outer wall surface of the bearing through the longitudinal center axis; after reaching the diameter ($D_V$), pushing the bearing into the end section in such a rotational position substantially without force so that the axial ribs come to rest in corresponding ones of the corners of the deformed end section; and, allowing the elasticity forces of the material of the end section to return deform the end section by loosening the clamping jaws so that the end section comes into force-tight contact engagement with the axial ribs.

The bearing lies only over portions of its periphery against the inner wall of the end section because of the outer configuration of the bearing. The outer diameter of the imaginary cylinder wall is greater than the inner diameter of the undeformed end section. The outer diameter of the imaginary cylinder wall is defined by the rib roofs of the axial ribs.

An axial insertion of the shaft bearing into the end section of the guide tube with little force is achieved by deforming or forming the end section to have corners by clamping the end section between clamping jaws. The number of corners corresponds to the number of axial ribs formed on the bearing. The deformation of the cross section of the end section into an approximately triangularly-shaped configuration when there are three axial ribs (similar to an equilateral triangle) provides a spacing between a corner and the inner wall of the deformed cross section which lies diametrically opposite the corner. Because of the deformation, the cross section is greater than the extension measured along the longitudinal center axis between a rib roof and the opposite-lying wall section. The bearing is now so aligned in its rotational position that each corner is assigned an axial rib. The spacing between a rib roof and the diametrically opposite-lying wall section of the bearing is less than the spacing of the corner to the diametrically opposite-lying wall of the deformed section. For this reason, the bearing can be axially inserted into the end section without force because of the radial play. The deformation of the end section to the configuration, which is required for the forceless insertion of the bearing, takes place in the elastic range of the material of the guide tube, which is preferably aluminum. Accordingly, when stress is taken off of the clamping jaws (that is, when the clamping device is withdrawn), the end section tends to return to its original cylindrical shape. The wall of the end section therefore lies force tight against the rib roofs whereby the bearing is held force tight in the end section so that it cannot separate in the axial direction and is held tightly in the peripheral direction so it cannot rotate.

The bearing, which is held force tight in the end section, can be additionally secured by a pin which projects radially into the end section and is preferably a holding screw.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
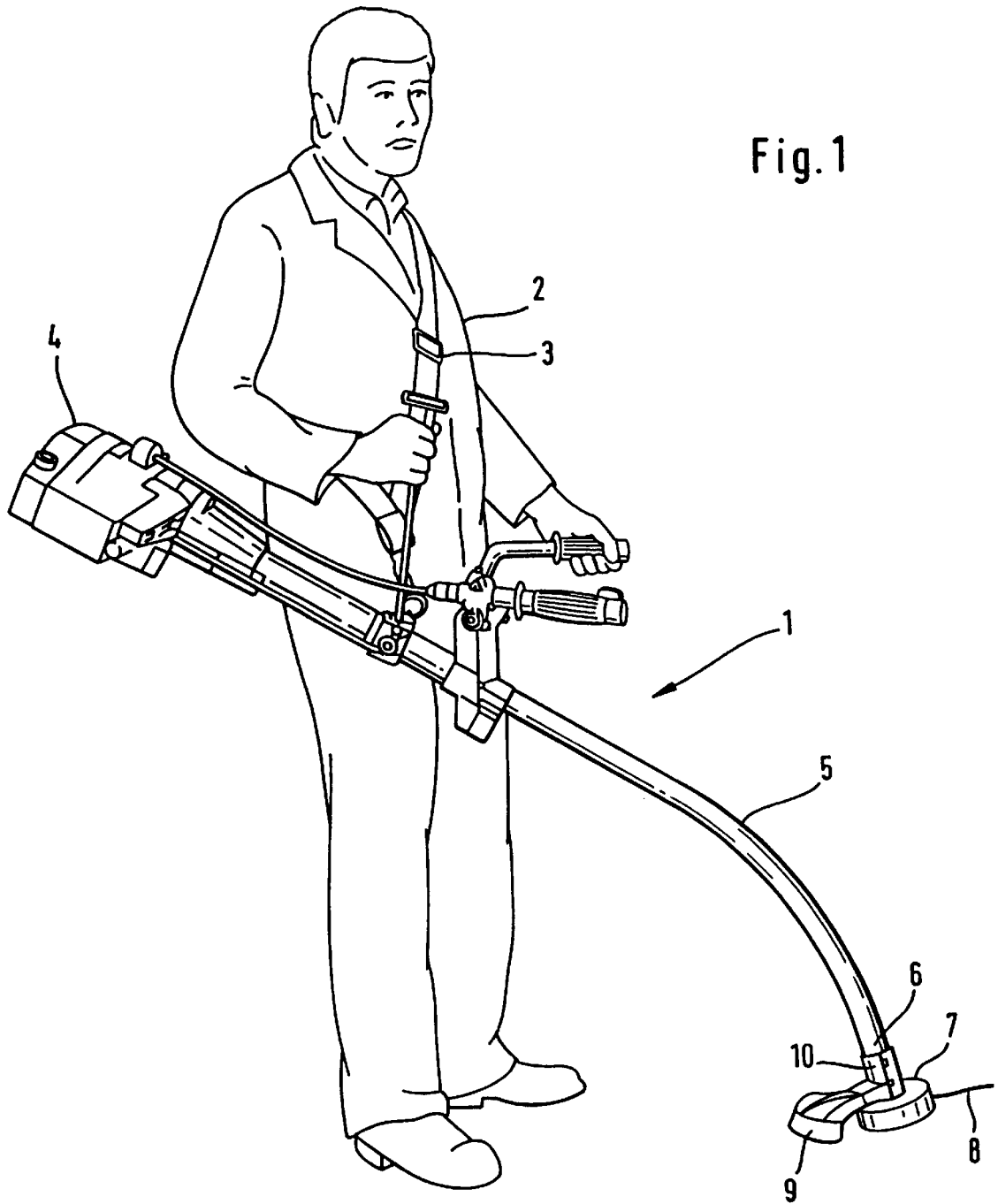
FIG. 1 is a perspective view of a vegetation cutter apparatus guided by an operator.

The vegetation cutter apparatus 1 shown in FIG. 1 is held by an operator 2 with the aid of a carrier belt 3 lying over the shoulder. The vegetation cutter apparatus 1 includes a drive motor 4 which, in the embodiment shown, is an internal combustion engine such as a two-stroke engine or a mixture-lubricated four-stroke engine. The drive motor 4 can also be an electric motor.

The drive motor 4 drives a drive shaft 14 (FIG. 8) which is journalled in a guide tube 5 in the form of a protective tube which is here shown with a bend. For this purpose, a sleeve bearing 15 (FIG. 8) is arranged between the drive shaft 14 and the guide tube 5. The sleeve bearing 15 is centered in the guide tube 5 via star-shaped axial ribs 13.

Figure 8:
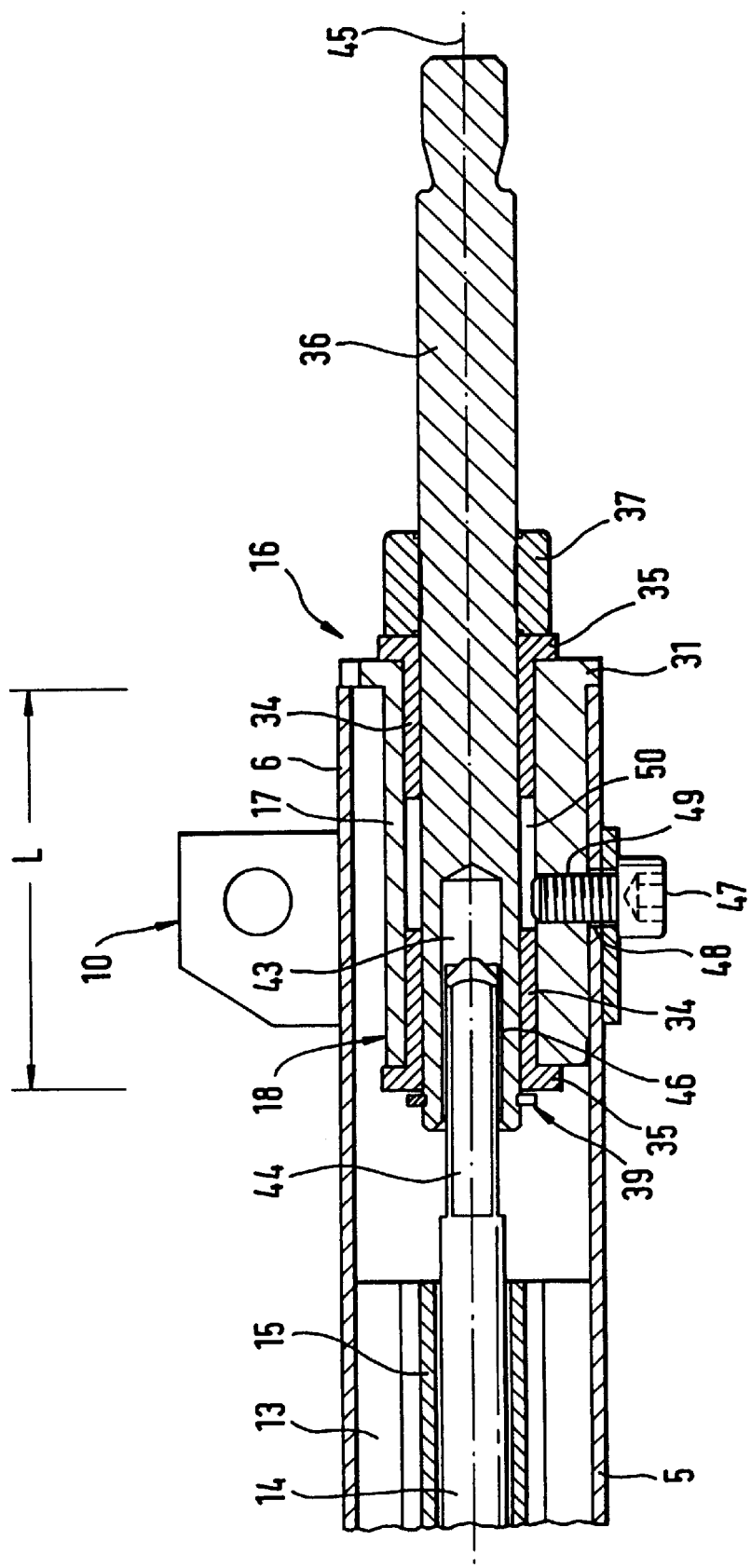

A cutterhead 7 is held at the lower end section 6 of the guide tube 5 by a bearing 16 (FIG. 8). In the embodiment, the cutterhead 7 is a string trimmer which includes at least one filament segment 8 projecting out of the cutterhead 7. The filament segment 8 defines a cutting work tool. A guard 9 is mounted above the cutterhead 7 and extends over a part of the periphery of the cutterhead. The guard 9 is attached to the guide tube section 6 with a clamp fitting 10. The clamp fitting 10 is preferably made of steel and engages around the end section of the guide tube 5 accommodating the bearing.

As shown in the section view of FIG. 8, the sleeve bearing 15 ends where the end section 6 starts so that the inner space of the end section is free to accommodate the bearing unit 16.

Figure 5:
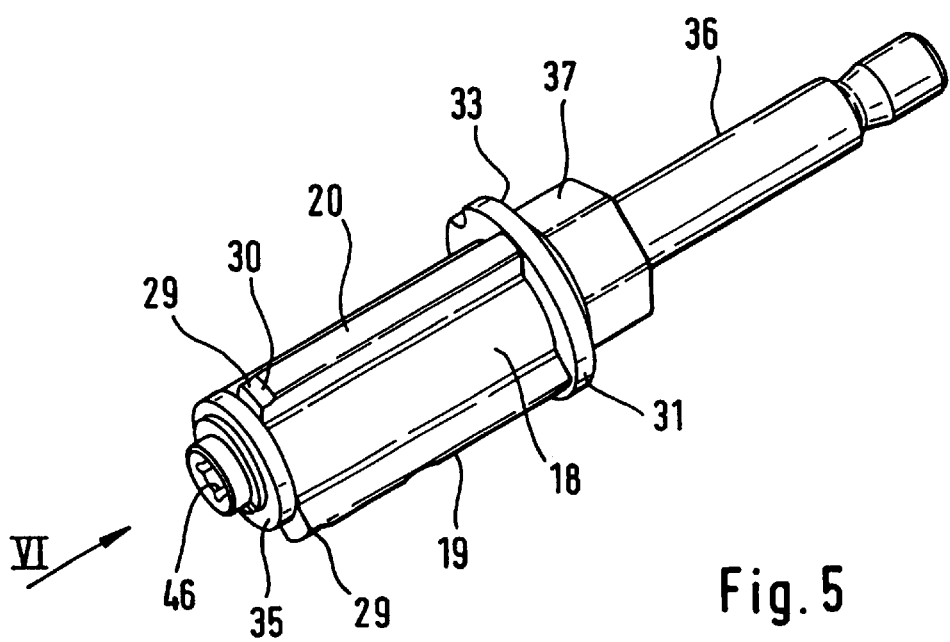
FIG. 5 is a perspective view of the bearing shown in FIG. 3.
Figure 6:
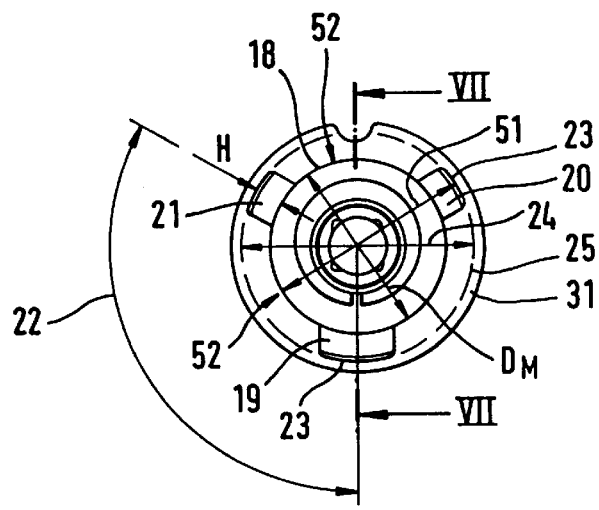
FIG. 6 is a view of the bearing in the direction of arrow VI in FIG. 5.
Figure 7:
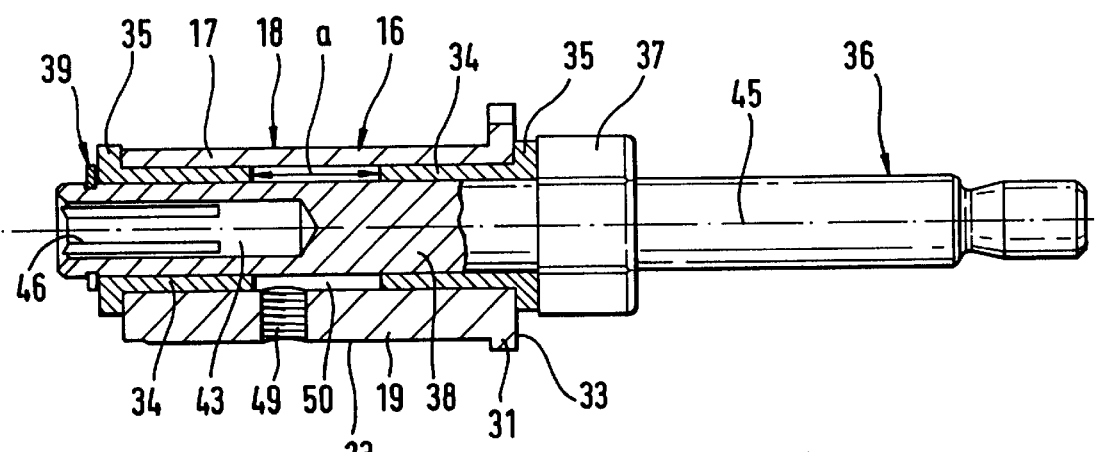
FIG. 7 is a view of the bearing in the direction of arrow VII in FIG. 6 and partially in section; and, FIG. 8 is a section view through the end section of the guide tube with the bearing installed.

The bearing unit 16 for the cutterhead 7 is shown in FIGS. 5 to 7 and includes an assembly sleeve 17 which defines the outer surface 18 of the bearing unit 16. Several axial ribs (19, 20, 21) are arranged on the outer surface 18 of the bearing unit 16. These axial ribs are uniformly distributed over the periphery of the surface 18.

As shown in FIG. 6, the one axial rib 19 is configured to be wider in the peripheral direction than the other axial ribs 20 and 21. In the embodiment shown, the axial rib 19 is approximately twice as wide as the other axial ribs 20 and 21. The center axes of the axial ribs (19, 20, 21) are uniformly spaced at the same angular spacing 22 from each other. This spacing for the three axial ribs is 120° in the embodiment shown. Each of the ribs (19, 20, 21) lies next to a rib-free region 52 of the outer surface 18. The rib roof 23 of each axial rib (19, 20, 21) is configured to be slightly rounded in the peripheral direction and preferably with a radius of curvature R (FIG. 2) which corresponds to the inner radius of the undeformed circular-cylindrical cross section of the end section 6 of the guide tube 5. The radial elevation H of the axial ribs (19, 20, 21) determines the maximum outer diameter 24 of an imaginary cylinder wall 25 (see FIG. 6).

Figure 2:
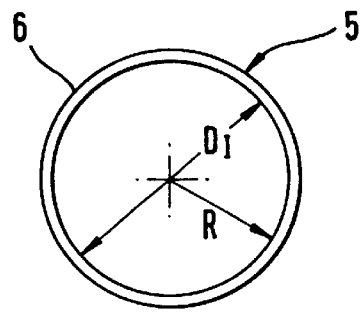
FIG. 2 is a section view through the guide tube arranged between the drive motor and the cutterhead.

The outer surface 18 of the bearing 16 has an outer diameter $D_M$ which is less than the inner diameter $D_I$ of the end section 6 of the guide tube 5 as shown in FIG. 2. The radial ribs (19, 20, 21) have a radial height H, which is measured from the outer surface 18, and is slightly greater than approximately half of the difference between the inner diameter $D_I$ of the end section 6 and the outer diameter $D_M$ of the surface 18 of the assembly sleeve 17. Because of the dimensioning of the radial height H, the outer diameter 24 of the imaginary cylinder wall 25 is greater than the inner diameter $D_I$ of the end section 6 of the guide tube 5. The imaginary cylinder wall 25 is determined by the rib roofs 23. An axial assembly of the bearing 16 in the end section 6 of the guide tube is therefore not possible in a simple manner.

Figure 3:
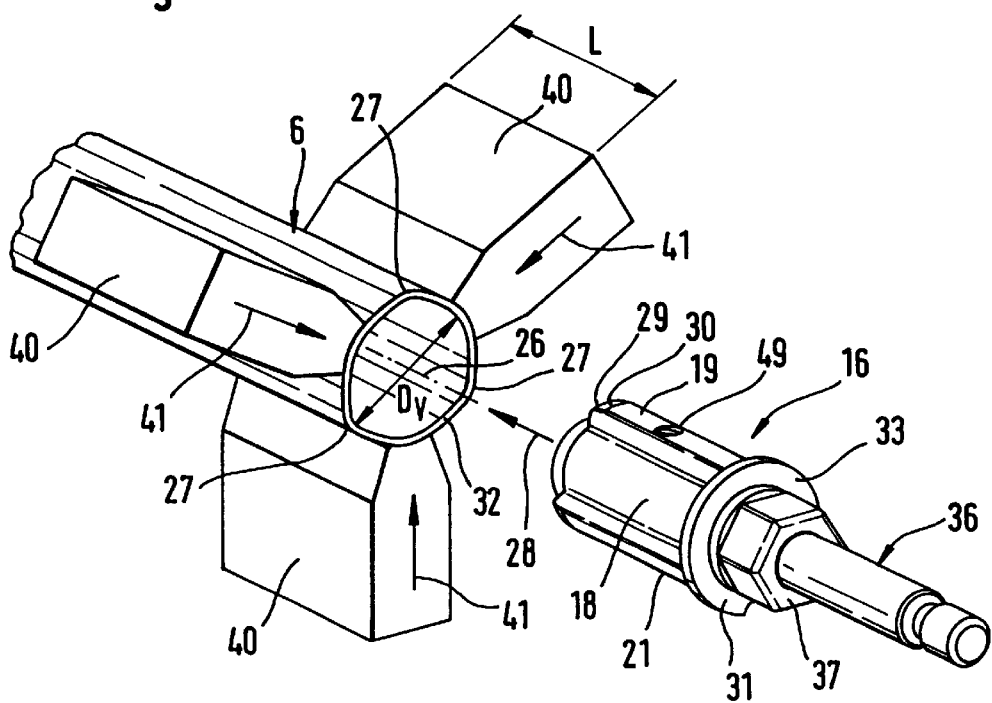
FIG. 3 is a perspective view of an assembly arrangement for mounting a bearing in the end section of the guide tube.

The end section 6 of the guide tube 5 is essentially elastically deformed for the axial mounting of the shaft bearing 16 in the end section by clamping the end section 6 between clamping jaws 40 over a length L until the cross section of the end section 6 assumes approximately a triangular shape as shown perspectively in FIG. 3. For this purpose, three clamping jaws 40 are arranged in this embodiment over the periphery of the end section 6 at the same angular spacing relative to each other and are radially moved simultaneously in the direction of arrows 41 toward the longitudinal center axis 26 of the end section 6. The end section 6 is essentially elastically so deformed over the length L between the clamping jaws 40 until the occurring cornered cross-sectional shape exhibits a deformation diameter $D_V$ measured over a corner 27. The length L is somewhat greater than the axial length of the bearing unit 16 and the deformation diameter $D_V$ is slightly greater than the maximum outer diameter 24 of the bearing 16 determined by the rib roofs 23. The bearing is now aligned in such a rotational position that each axial rib (19, 20, 21) comes into contact approximately in a corner 27 of the end section 6 deformed in accordance with FIG. 3. The diameter $D_V$ which is measured across the corners, is greater than the spacing 51 of the rib roof 23 to the diametrically opposite-lying wall section 52 of the bearing unit 16. For this reason, the bearing unit 16 can be pushed axially into the end section 6 substantially without force. The diameter $D_V$ is the spacing between a corner 27 and the inner wall surface of the end section 6 lying diametrically opposite through the longitudinal center axis 26.

The ends of the ribs (19, 20, 21), which lie forward in the direction of insertion 28, each have a cropped head section 29 reduced in elevation (FIGS. 3 and 5) for facilitating the insertion of the bearing 16 into the deformed end section 6. Preferably, the transition between the cropped head section 29 and the ribs (19, 20, 21) is configured as an inclined surface 30 or rounding which facilitates the axial insertion into the end section 6 without force. The bearing 16 is inserted into the end section 6 up to contact engagement with the radial flange 31 on the free end 32. The radial flange 31 is provided at the ends of the ribs (19, 20, 21) as an outside end face 33 of the assembly sleeve 17. The ends of the ribs (19, 20, 21) lie opposite the cropped head section 29.

Figure 4:
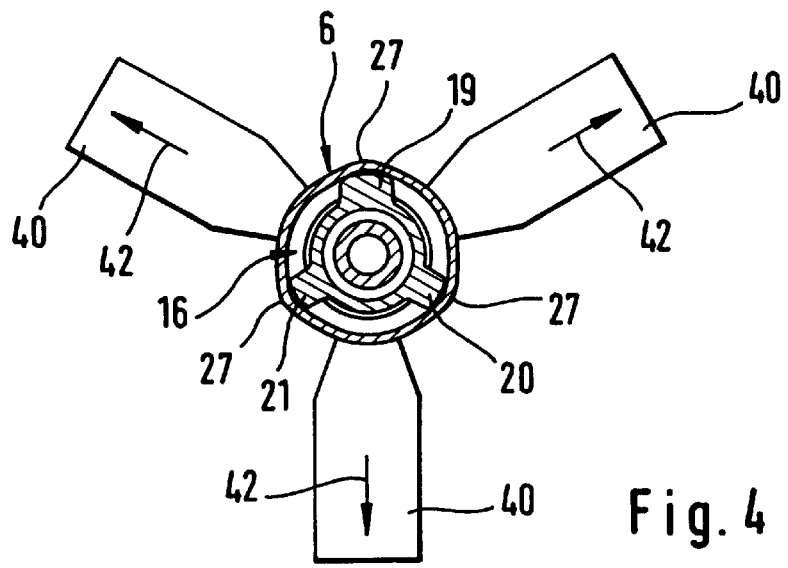
FIG. 4 is a section view through the assembly arrangement of FIG. 3 with the bearing inserted.

The radial flange 31 delimits the insert depth. After the complete insertion of the assembly sleeve 17 up to the radial flange 31, the clamping jaws 40 are moved back in the direction of arrows 42 as shown in FIG. 4 so that the released elasticity forces of the guide tube deform back the cross section of the end section with a force-tight contact of its wall against the axial ribs (19, 20, 21) in the direction toward the starting form shown in FIG. 2. These elasticity forces are released because of the elasticity of the material of the guide tube 5. In this way, the bearing 16, that is, its assembly sleeve 17 is held force tight in the end section 6.

For the force-tight fixation of the assembly sleeve 17 in the end section 6, it is essential that the clamping jaws 40 are moved so carefully in the direction of arrows 41 toward the longitudinal center axis 26 that the clamping movement is stopped in time when reaching the desired diameter $D_V$. In this way, the elasticity of the material of the guide tube 5 can be used to a maximum. A possibly occurring remaining deformation at the start of the clamping movement in the direction of arrows 41 is insignificant since the elasticity forces are only to be made available in the region of the pregiven diameter $D_V$. As shown in FIG. 4, the cross section of the end section 6 with the assembled bearing 16 has a configuration which deviates slightly from the form of a circle. The embodiment shown has an approximately circular-triangular shape when viewed in section and the form is similar to an equilateral triangle.

Bearing bushings 34 (FIG. 7) are inserted into respective ends of the assembly sleeve 17. The axial insert depth of the bearing bushings 34 is delimited by a ring flange 35 at the respective ends. The inner end faces of the bearing bushings 34 lie at a spacing (a) opposite each other as shown in FIG. 7.

A shaft 36 is inserted into the bearing bushings 34 configured as a sleeve bearing. The shaft 36 has a center section 37 which is expanded in diameter. The end section 38 lies on the one side of the center section 37 and is rotatably held in the bearing sleeve 35. The end, which projects out of the assembly sleeve 17, carries a retaining ring 39. The assembly sleeve 17 with the bearing bushings 34 is held between the center section 37 and the retaining ring 39 so that it cannot separate therefrom. The other end section of the shaft 36 lies on the other side of the center section 37 and carries the cutting tool. In FIG. 1, the cutting tool is a cutterhead having a filament cutter.

The end section 38 is held in the bearing 16 and includes a central blind bore 43 which is coaxial to the longitudinal center axis 45 of the shaft 36. The bore 43 is configured to have multiple corners in the forward section 46 when viewed in cross section and functions to tightly engage an end section 44 of the drive shaft 14 (FIG. 8). The connection of the drive shaft 14 with the shaft 36 of the bearing 16 takes place with the insertion of the bearing 16 into the end section 6 in the insert direction 28 (FIG. 3).

The bearing 16 is held force tight in the end section 6 and is additionally secured form-tight by a pin. In the embodiment shown, the pin is in the form of a holding screw 47. The holding screw passes through an opening 48 in the end section 6 and is threadably engaged in a threaded bore 49 of the assembly sleeve 17. The threaded bore 49 advantageously lies in the axial rib 19 as shown in FIGS. 6 and 7. The axial rib 19 is configured so as to be wider in the peripheral direction.

The inner end faces of the bearing bushings 34, which lie at a spacing (a) from each other, delimit an interior annular space of the assembly sleeve which is advantageously used as a grease chamber 50. The threaded bore 49 is positioned in such a manner in the axial rib 19 that it opens into the annular cylindrical grease chamber 50. In the assembly position shown in FIG. 8, the opening 48 lies in the end section so as to be coincident with the threaded bore 49 which, in turn, opens into the grease chamber 50 so that the grease chamber 50 can be refilled with grease for lubrication of the bearing, as required, after loosening the retaining screw 47.

As shown in FIG. 8, a clamp 10 is fixed at the same time by the retaining screw 47. The clamp 10 is preferably made of steel and the guide tube 5 is especially made of aluminum. Additional components can be mounted on the steel clamp such as a guard 9.

It is understood that the foregoing description is that of the preferred embodiments of the invention and that various changes and modifications may be made thereto without departing from the spirit and scope of the invention as defined in the appended claims.

What is claimed is:

1. A work apparatus comprising:

a drive motor;

a guide tube having an end connected to said drive motor and having an end section facing away from said drive motor;

a rotatably driven work tool mounted on said end section;

a drive shaft rotatably journalled in said guide tube and connecting said drive motor to said work tool so as to permit said drive motor to rotatably drive said work tool;

said end section defining a longitudinal axis and having an interior space;

said end section further having an inner diameter ($D_I$) before being formed;

a bearing axially inserted into said interior space for mounting said work tool on said end section;

said bearing having an outer surface and a plurality of axial ribs formed on said outer surface;

said axial ribs having respective rib roofs conjointly defining an imaginary cylinder having an outer diameter greater than said inner diameter ($D_I$) of said end section;

said bearing having an outer shape when viewed in cross section characterized by said outer surface with said axial ribs; and, said end section of said guide tube being elastically formed to assume a shape corresponding to said outer shape of said bearing for surroundingly force tightly holding said bearing.

2. The work apparatus of claim 1, said outer surface of said bearing having an outer diameter ($D_M$) which is less than said inner diameter ($D_I$) of said end section; said axial ribs each having a height (H) slightly greater than approximately half of the difference between said inner diameter ($D_I$) and said outer diameter ($D_M$) of said outer surface of said bearing.

3. The work apparatus of claim 2, each two mutually adjacent ones of said axial ribs being separated by a clear wall region of said outer surface; and, each one of said axial ribs lying diametrically opposite one of the clear wall regions.

4. The work apparatus of claim 3, said axial ribs being at least three in number and said axial ribs being at equal angular spacings one from the other.

5. The work apparatus of claim 2, each of said rib roofs being rounded.

6. The work apparatus of claim 5, said end section having an inner radius (R) before being formed; and, said rib roofs being rounded to also have said inner radius (R).

7. The work apparatus of claim 1, said bearing comprising an outer assembly sleeve and inner bearing bushings mounted in said outer assembly sleeve.

8. The work apparatus of claim 7, said inner bearing bushings being sleeve bearings inserted at opposite ends of said outer assembly sleeve.

9. The work apparatus of claim 8, said outer assembly sleeve having an annular end flange; and, said annular end flange defining a stop when said outer assembly sleeve is inserted into said end section thereby limiting the insertion depth of said outer assembly sleeve.

10. The work apparatus of claim 1, said cross section of the formed end section having a somewhat three-cornered shape.

11. The work apparatus of claim 10, wherein said somewhat three-cornered shape corresponds to an equilateral triangle.

12. The work apparatus of claim 1, wherein said guide tube is made of aluminum.

13. The work apparatus of claim 9, further comprising a pin projecting radially into said end section to tightly hold said bearing.

14. The work apparatus of claim 13, said pin being a holding screw.

15. The work apparatus of claim 14, said outer assembly sleeve having a threaded bore formed therein; and, said holding screw threadably engaging said outer assembly sleeve in said threaded bore.

16. The work apparatus of claim 15, wherein said threaded bore is formed in one of said axial ribs.

17. The work apparatus of claim 16, said bearing including a lubricant chamber; and, said threaded bore opening into said lubricant chamber.

18. A method for axially assembling a bearing in an end section of a guide tube which approximately concentrically surrounds a drive shaft, the end section having a longitudinal center axis and having an inner diameter ($D_I$) before being formed; said bearing having an outer surface and a plurality of axial ribs formed on said outer surface; said axial ribs having respective rib roofs conjointly defining an imaginary cylinder having an outer diameter greater than said inner diameter ($D_I$) of said end section; the method comprising the steps of:

essentially elastically deforming said end section by clamping said end section between clamping jaws so that a cornered cross-sectional shape is imparted to said end section with said clamping jaws being applied until said cornered cross-sectional shape has a diameter ($D_V$) measured from a corner which is slightly greater than a distance measured between a rib roof of one of said axial ribs and a diametrically opposite lying outer wall surface of said bearing through said longitudinal center axis;

after reaching said diameter ($D_V$), pushing said bearing into said end section in such a rotational position substantially without force so that said axial ribs come to rest in corresponding ones of said corners of the deformed end section; and, allowing the elasticity forces of the material of said end section to return deform said end section by loosening said clamping jaws so that said end section comes into force-tight contact engagement with said axial ribs.

19. The method of claim 18, comprising the further step of applying three clamping jaws to said end section at equal angular spacings from each other; and, simultaneously radially moving said clamping jaws toward said longitudinal center axis.

20. The method of claim 18, wherein said bearing has an annular flange formed thereon; and, said bearing is inserted into said end section until said annular flange comes into contact engagement with the free end face of said end section.

* * * * *